United States Patent [19]
Hashimoto et al.

[11] Patent Number: 5,655,898
[45] Date of Patent: Aug. 12, 1997

[54] REED VALVE ARRANGEMENT FOR A RECIPROCATING COMPRESSOR

[75] Inventors: Kenji Hashimoto, Yamada-gun; Yoshito Matsumura, Seta-gun, both of Japan

[73] Assignee: Sanden Corporation, Gunma, Japan

[21] Appl. No.: 745,846

[22] Filed: Nov. 12, 1996

Related U.S. Application Data

[63] Continuation-in-part of Ser. No. 555,698, Nov. 14, 1995, Pat. No. 5,586,874.

[51] Int. Cl.$^6$ .................................................. F04B 53/10
[52] U.S. Cl. ........................ 417/569; 137/855; 137/856
[58] Field of Search ................................. 417/569, 571, 417/312; 137/855, 856, 513.5, 521

[56] References Cited

U.S. PATENT DOCUMENTS

| | | | |
|---|---|---|---|
| 2,151,746 | 3/1939 | Cody | 137/856 |
| 4,730,550 | 3/1988 | Bramstedt et al. | 137/855 |
| 5,595,214 | 1/1997 | Shaffer et al. | 137/855 |

FOREIGN PATENT DOCUMENTS

| | | | |
|---|---|---|---|
| 699434 | 3/1931 | France | 137/856 |
| 1040214 | 9/1983 | U.S.S.R. | 137/855 |

*Primary Examiner*—Roland McAndrews, Jr.
*Attorney, Agent, or Firm*—Baker & Botts, L.L.P.

[57] ABSTRACT

A fluid displacement apparatus comprises a valve plate member dividing a compressor housing into a first chamber and a discharge chamber. A passage is formed in the valve plate member to allow communication between the first chamber and the discharge chamber. An elastic valve member disposed on the valve plate bends to open and close the end of the passage. The valve retainer member is secured to the valve plate together with the elastic valve member and has a curved end portion. A valve seat includes a recessed portion offset from an end surface of the valve plate. The recessed portion includes an inclined portion and a wall portion extending therefrom. The distance between the beginning of the curved portion of the valve retainer member and the securing means is greater than the distance between an edge of the recessed portion of the valve seat and the securing means. Noise and vibration caused by the striking of discharge reed valve against the valve seat and the retainer member are decreased according to this arrangement.

11 Claims, 6 Drawing Sheets

FIG. 10

REED VALVE ARRANGEMENT FOR A RECIPROCATING COMPRESSOR

CROSS REFERENCE TO RELATED APPLICATION

This application is a continuation-in-part of U.S. patent application Ser. No. 08/555,698, filed on Nov. 14, 1995, now U.S. Pat. No. 5,586,874.

BACKGROUND OF THE INVENTION

1. Field of the Invention

The present invention relates to a fluid displacement apparatus, and more particularly, to a valved discharge mechanism of a refrigerant compressor used in an automotive air conditioning system.

2. Description of the Prior Art

Figure 1:
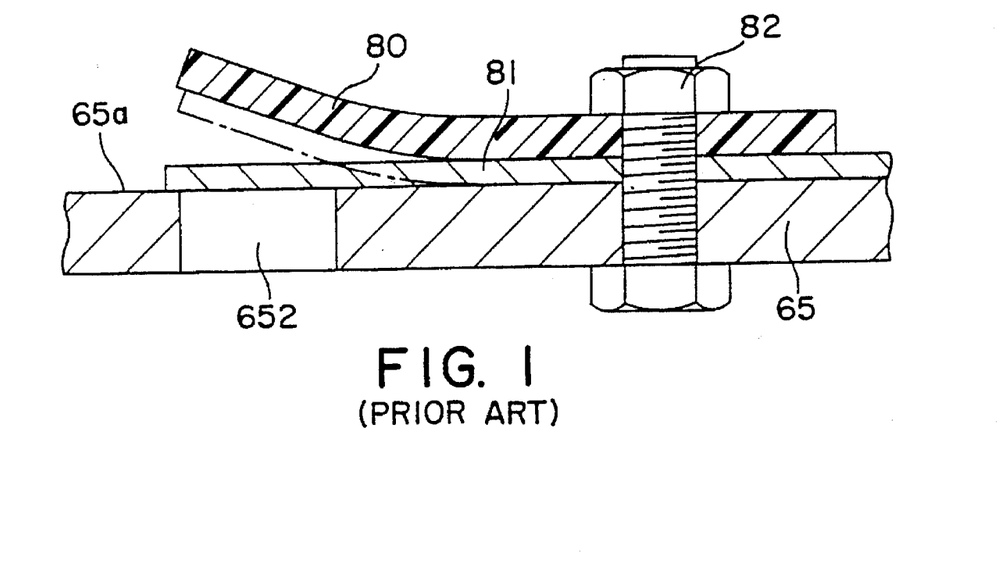
FIG. 1 is an enlarged partial sectional view of a discharge valve assembly in accordance with the prior art.

Valved discharged mechanisms of refrigerant compressors are well known in the prior art. For example, FIG. 1 depicts a valved discharge mechanism used in a refrigerant compressor as described in U.S. Pat. No. 4,978,285. As disclosed therein, a refrigerant compressor includes a compressor housing defining a compression chamber in which successive strokes of intake, compressing, and discharge of a refrigerant gas are repeatedly performed. Further, the compressor includes valve plate 65, which partitions the compression chamber from the discharge chamber, and a discharge valve assembly, which is mounted on an end surface of valve plate 65. Valve plate 65 has discharge hole 652 extending therethrough to allow communication of the compression chamber with the discharge chamber. The discharge valve assembly includes discharge reed valve 81 and valve retainer 80, which are secured to the end surface 65a of valve plate 65 by bolt 82. Discharge reed valve 81, which is made of an elastic material, regulates the flow of the refrigerant gas and sealingly engages end surface 65a of valve plate 65 when the operation of the compressor is stopped.

Valve retainer 80 limits the bending movement of discharge reed valve 81 in the direction in which the refrigerant gas exits the compression chamber and enters the discharge chamber through discharge hole 652. Discharge reed valve 81 has an elastic modulus which keeps discharge hole 652 closed until the pressure in the compression chamber reaches a predetermined value. In such an arrangement, discharge reed valve 81 strikes retainer 80 when it opens, and strikes end surface 65a of valve plate 65 when it closes. A compressor with such a discharge valve arrangement generates vibration and noise during operation of the compressor due to this striking. Vibrations caused by reed valve 81 striking end surface 65a of valve plate 65 are particularly disadvantageous, i.e., readily transmitted to the compressor housing.

Figure 2:
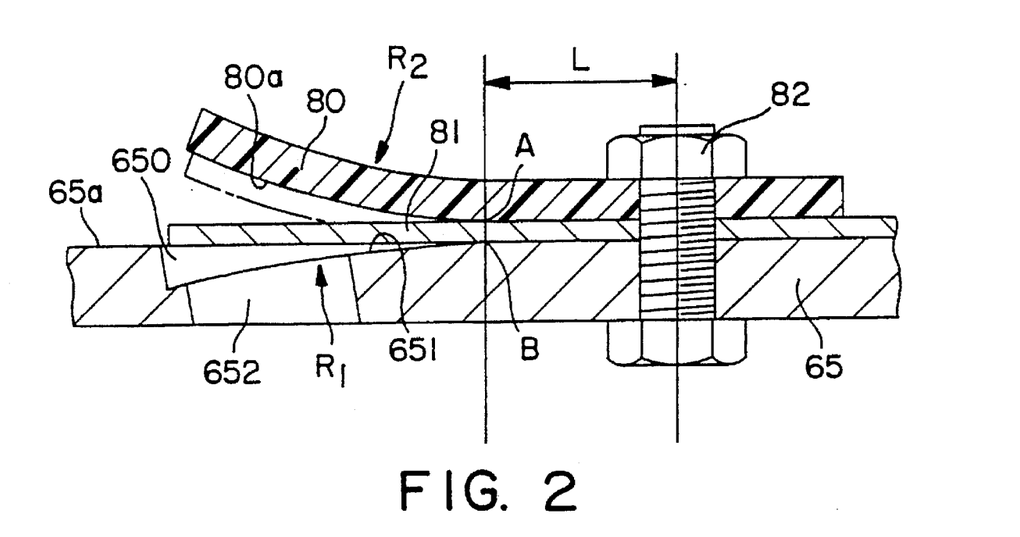
FIG. 2 is an enlarged partial sectional view of another discharge valve assembly.

One solution attempted by the assignee of the present application is depicted in FIG. 2. Though not prior art, this attempt is illustrative of progress in this area. There, valve plate 65 includes recessed portion 650 formed so that its depth increases with distance from point B, which is located on valve plate 65 and is spaced a distance L from bolt 82. Recessed portion 650 includes curved surface 651 surrounding discharge hole 652. When discharge reed valve 81 is in its closed position, it sealingly engages curved surface 651. Curved surface 651 has a radius of curvature R1, which defines the closing deformation of discharge reed valve 81.

Further, retainer 80 includes curved surface 80a having radius of curvature R2, which defines the opening deformation of discharge reed valve 81. Radius of curvature R1 is designed to be equal to or less than radius of curvature R2 so that when reed valve 81 closes, its elastic restoring force will not cause it to strike end surface 65a of valve plate 65. Curved surface 80a of retainer 80 begins curving away from valve plate 65 at point A, which is also spaced a distance L from bolt 82.

In this arrangement, the impact force with which discharge reed valve 81 strikes curved surface 651 of valve plate 65 is smaller than that which discharge reed valve 81 strikes retainer 80. This occurs because in the arrangement of FIG. 2, discharge reed valve 81 returns to its closed position primarily due to the pressure difference between the cylinder chamber and the discharge chamber, rather than because of the elastic restoring force of discharge reed valve 81. Therefore, noise and vibration which are caused by the striking of discharge reed valve 81 are reduced in comparison with the arrangement of FIG. 1. However, this arrangement does not account for noise and vibration caused by discharge reed valve 81 striking retainer 80.

As a result, vibration and noise still propagate to the passenger compartment.

SUMMARY OF THE INVENTION

It is an object of the present invention to provide a fluid displacement apparatus for use in an automotive air conditioning system having a valved discharge mechanism which can effectively reduce the vibration noise emitting from a discharge valve assembly and thus, reduce the propagation of noise to the passenger compartment of the vehicle.

It is a further object of the present invention to provide a fluid displacement apparatus wherein volumetric efficiency is improved.

According to the present invention, a fluid displacement apparatus comprises a valve plate member dividing the fluid displacement apparatus into a first chamber and a second chamber, wherein the second chamber comprises a discharge chamber. A passage extends through the valve plate member to connect the first chamber with the discharge chamber. An elastic valve member is disposed on the valve plate. The valve member opens and closes the passage. The valve member is designed to block the passage until the pressure in the first chamber exceeds a predetermined value. A valve retainer member and the elastic valve member are secured to the valve plate by a securing member. The valve retainer member has a curved portion formed at radial end portions thereof for limiting the bending of the elastic valve member in the direction in which the fluid exits the passage. A valve seat surrounds the open end of the passage. The valve seat includes a recessed portion offset from the end surface of the valve plate. The recessed portion includes an inclined portion and a wall portion extending therefrom. The inclined portion ensures that the elastic valve member gently closes the passage due to the pressure differential between the discharge chamber and the passage. The distance between the beginning of the curved portion of the valve retainer member to the securing means is greater than the distance between the beginning of the curved portion of the recessed portion of the valve seat to the securing means.

Further objects, features and other aspects of the present invention will be understood from the detailed description of the preferred embodiments with reference to the annexed drawings.

DETAILED DESCRIPTION OF THE PREFERRED EMBODIMENTS

Figure 3:
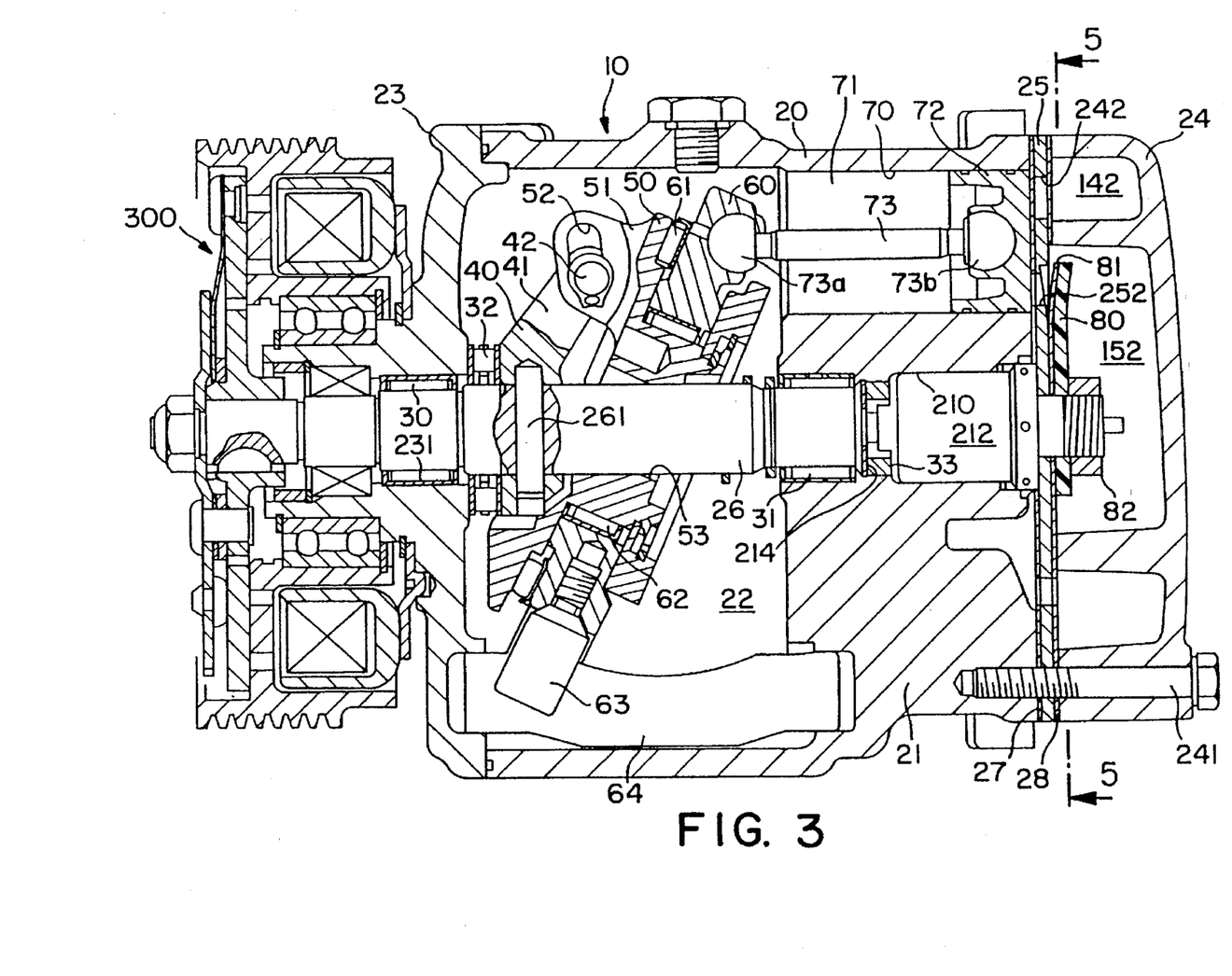
FIG. 3 is a longitudinal sectional view of a slant plate type refrigerant compressor in accordance with the present invention.

With reference to FIG. 3, a fluid displacement apparatus in accordance with the preferred embodiments is shown. The fluid displacement apparatus is described in terms of a piston type compressor, but it will be readily appreciated by those skilled in the art that the invention could be adapted to other fluid displacement apparatuses.

The compressor comprises a cylindrical housing assembly 20 including cylinder block 21, crank chamber 22, front end plate 23, rear end plate 24, and valve plate 25. Crank chamber 22 is formed between cylinder block 21 and front end plate 23. Front end plate 23 is mounted on one end of cylinder block 21 by a plurality of bolts (not shown). Rear end plate 24 is mounted on the opposite end of cylinder block 21 by a plurality of bolts 241. Valve plate 25 is located between rear end plate 24 and cylinder block 21. Opening 231 is centrally formed in front end plate 23 and supports drive shaft 26 through bearing 30. The inner end portion of drive shaft 26 is rotatably supported by bearing 31 disposed within a center bore 210 of cylinder block 21. Bore 210 extends to a rearward end surface of cylinder block 21, wherein a valve control mechanism 212 is disposed.

Cam rotor 40 is fixed on drive shaft 26 by pin member 261 and rotates with drive shaft 26. Thrust needle bearing 32 is disposed between the inner end surface of front end plate 23 and the adjacent axial end surface of cam rotor 40. Cam rotor 40 includes arm 41 having pin member 42 extending therefrom. Slant plate 50 is adjacent cam rotor 40 and includes opening 53 through which drive shaft 26 passes. Slant plate 50 includes an arm 51 having a slot 52 formed therein. Cam rotor 40 and slant plate 50 are connected by pin member 42. Slot 52 allows adjustment of the angular position of slant plate 50 with respect to the longitudinal axis of drive shaft 26.

Wobble plate 60 is nutatably mounted on slant plate 50 through bearings 61 and 62. Fork-shaped slider 63 is attached to the outer peripheral end of wobble plate 60 and is slidably mounted on sliding rail 64 held between front end plate 23 and cylinder block 21. Fork-shaped slider 63 prevents rotation of wobble plate 60, and wobble plate 60 nutates along rail 64 when cam rotor 40 rotates. Cylinder block 21 includes a plurality of peripherally located cylinder chambers 70 in which pistons 72 reciprocate. Each piston 72 is connected to wobble plate 60 by a corresponding connecting rod 73.

Rear end plate 24 includes peripherally located annular suction chamber 142 and centrally located discharge chamber 152. Valve plate 25 is located between cylinder block 21 and rear end plate 24 and includes a plurality of valved suction holes 242 linking each suction chamber 142 with respective cylinders 70. Valve plate 25 also includes a plurality of valved discharge holes 252 linking discharge chamber 152 with cylinder chambers 70.

Each suction chamber 142 includes an inlet port, which is connected to an evaporator of the external cooling circuit (not shown). Discharge chamber 152 is provided with an outlet port, which is connected to a condenser of the cooling circuit (not shown). Gaskets 27 and 28 seal the mating surfaces of cylinder block 21, valve plate 25 and rear end plate 24.

Disk-shaped adjusting screw member 33 is disposed in a central region of bore 210 between the inner end portion of drive shaft 26 and a valve control mechanism 212. Disk-shaped adjusting screw member 33 is screwed into bore 210 so that it contacts the inner end surface of drive shaft 26 through washer 214, and permits adjustments to the axial position of drive shaft 26. Piston assembly 71 includes connecting rod 73, which has a pair of ball portions 73a and 73b formed at both ends thereof, and a cylindrically-shaped piston 72, which is connected to ball portion 73b.

Figure 4:
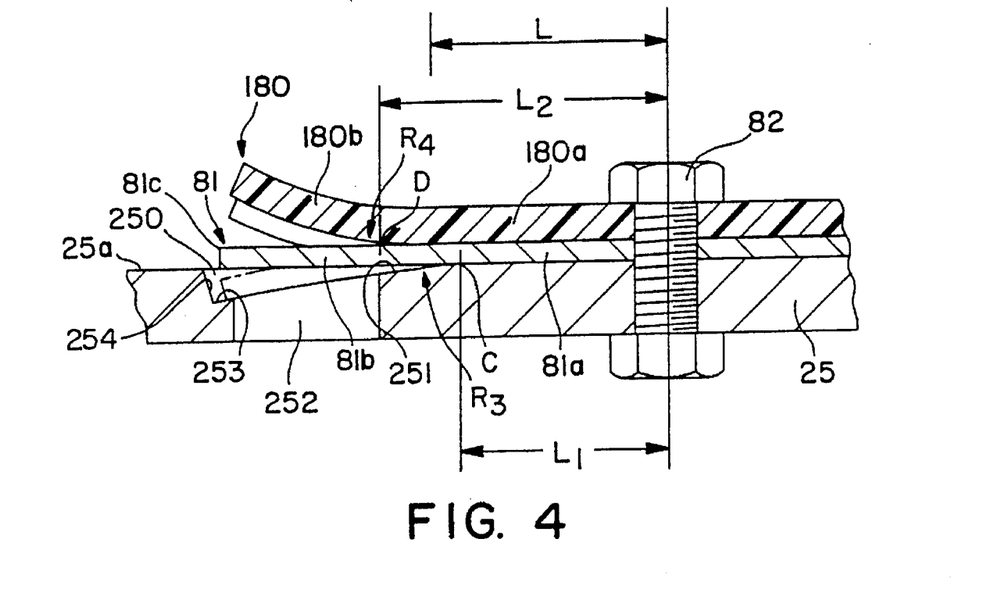
FIG. 4 is an enlarged partial sectional view of a discharge valve assembly in accordance with a first embodiment of the present invention.
Figure 5:
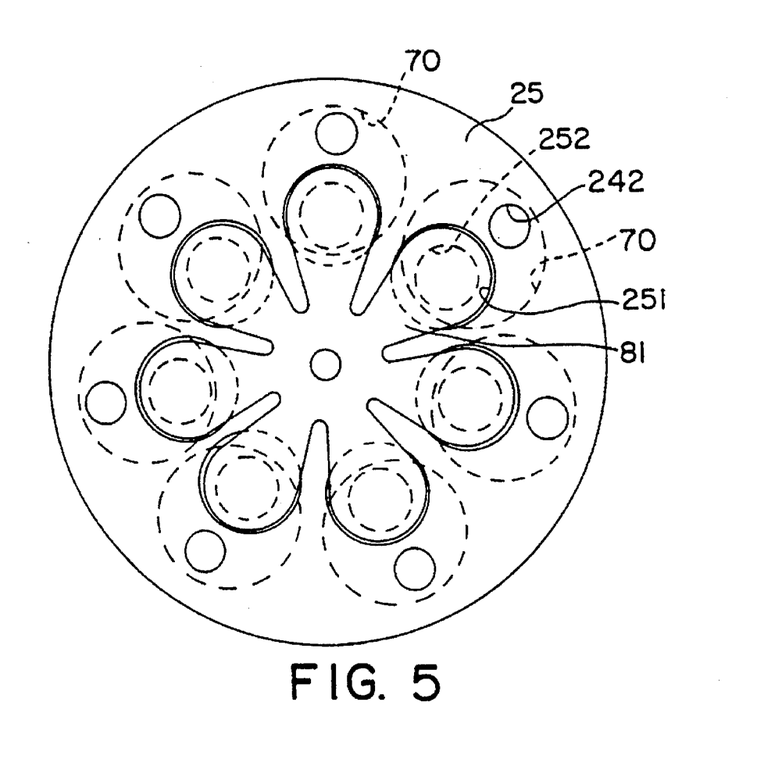
FIG. 5 is a cross sectional view of the discharge valve assembly taken along line 5—5 of FIG. 3.

Referring to FIGS. 4 and 5, the discharge valve assembly includes discharge reed valve 81 and valve retainer 180 which are secured to valve plate 25 by bolt 82. Discharge reed valve 81, which is made of an elastic member, e.g., thin spring steel, regulates the flow of the refrigerant gas. Discharge reed valve 81 has a substantially flat portion 81a formed to the side of bolt 82 and a sealing portion 81b extending from portion 81a.

Valve plate 25 includes recessed portion 250 formed so that its depth increases with radial distance from point C, which is spaced by a distance L1 from bolt 82. Recessed portion 250 includes inclined or curved surface 251 surrounding discharge hole 252. When discharge reed valve 81 is in its closed position, it sealingly engages curved surface 251. Inclined surface 251 has a curved cross section passing through point C and having a radius of curvature R3. The curved cross section defines the maximum amplitude of natural vibration when discharge reed valve 81 vibrates with point C as the fulcrum as shown by the phantom representation of discharge reed valve 81. In other words, the natural vibration shape of discharge reed valve 81 approximates a curve having radius of curvature R3.

Recessed portion 250 includes end wall 254 extending from inclined surface 25. End wall is preferably parallel to outside edge 81c of discharge reed valve 81 when seated against inclined surface 251. A gap is created between end wall 254 of valve plate 25 and edge 81c of discharge reed valve 81. Further, valve plate 25 includes discharge hole 252 extending therethrough. Recessed portion 250 and the portions therein, i.e., inclined surface 251, end surface 25a, and front end 253 of inclined surface 251, collectively comprise a valve seat.

Further, valve retainer 180 includes two surface portions, flat surface portion 180a and curved surface portion 180b. At a point D, which is spaced a distance L2 from bolt 82, curved surface portion 180b begins. Curved surface 180b has a curved cross section passing through point D and having a radius of curvature R4. The curved cross section defines the maximum amplitude of natural vibration when discharge reed valve 81 vibrates with point D as the fulcrum. In other words, the natural vibration shape of discharge reed valve 81 approximates a curve having radius of curvature R4. Valve retainer 180 is preferably made of a resin or engineering plastic, e.g., polyacetal resin.

Valve retainer 180 limits the bending movement of discharge reed valve 81 in the direction which the refrigerant gas exits discharge hole 252. Discharge reed valve 81 bends as it opens and closes discharge hole 252, and has a spring constant which allows discharge reed valve 81 to block discharge hole 252 until the pressure in compression chamber 70 reaches a predetermined value. The relationship of L, L1 and L2 is such that L1<L <L2.

During operation of the fluid displacement apparatus, drive shaft 26 is rotated by the engine of the vehicle through electromagnetic clutch 300. Cam rotor 40 is driven by drive shaft 26, which rotates slant plate 50 as well, which in turn causes wobble plate 60 to nutate. Nutational motion of wobble plate 60 reciprocates pistons 72 in their respective cylinders 70. As pistons 72 are reciprocated, refrigerant gas, which is introduced into suction chamber 142 through inlet ports, is then compressed. The compressed refrigerant gas is discharged to discharge chamber 152 from each cylinder 70 through discharge holes 252, and from there into the cooling circuit through the outlet port.

The impact force with which discharge reed valve 81 strikes retainer 180 is smaller than that which discharge reed valve 81 strikes retainer 80 in the arrangements of FIGS. 1 and 2. This is due to the realization that discharge reed valve 81 more readily resists bending toward retainer 180 in the embodiment of FIG. 4, whereas discharge reed valve 81 in the configuration of FIGS. 1 and 2 more readily bends toward retainer 80. The magnitude of flexural rigidity of discharge reed valve 81, which is shaped as a leaf spring, is generally inversely proportional to the distance from the fulcrum point. Distance L2 of FIG. 4 is greater than distance L in FIG. 2. Thus, the flexural rigidity which discharge reed valve 81 has when bending toward retainer 180 with point D as the fulcrum is smaller than that with point A as the fulcrum as in FIG. 2 (or FIG. 1). As a consequence, noise and vibration caused by discharge reed valve 81 striking retainer 180 decreases, and discharge reed valve 81 quickly returns to inclined surface 251 at the beginning of the suction stage. This improvement further provides a discharge reed valve which reliably closes the discharge hole during the suction stage.

Figure 8:
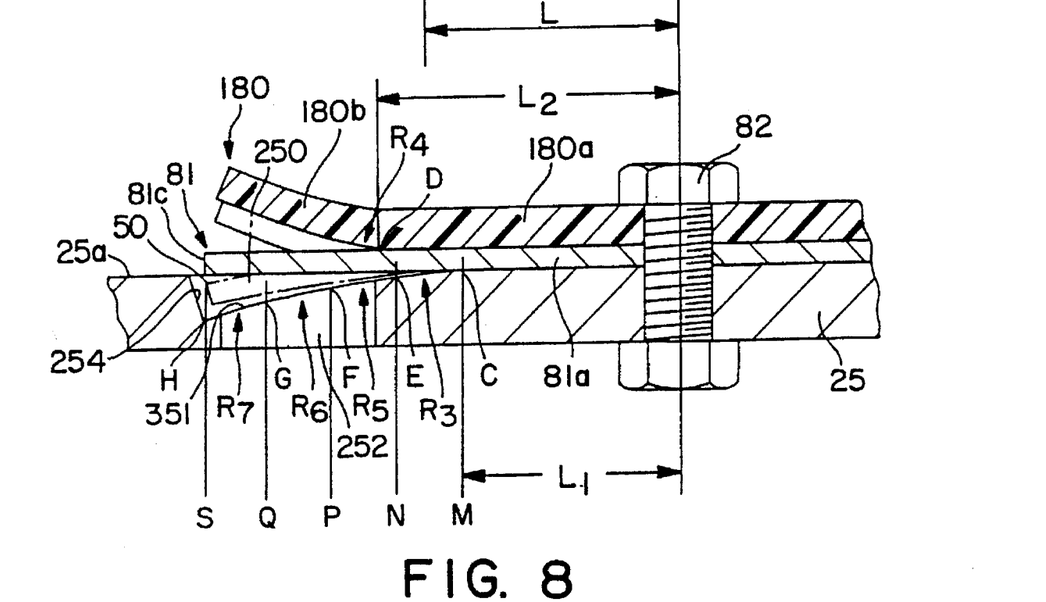
FIG. 8 is an enlarged partial sectional view of a discharge valve assembly in accordance with a second embodiment of the present invention.

FIG. 8 illustrates a second preferred embodiment of the present invention. Elements in FIG. 8 similar to those in FIG. 4 are designated with the same reference numerals. Valve plate 25 includes recessed portion 250 whose depth increases with distance from point C, which is located on valve plate 25 and spaced a distance L1 from bolt 82. Recessed portion 250 includes curved or inclined surface 351 surrounding discharge hole 252. When discharge reed valve 81 is in its closed position, it sealingly contacts curved surface 351.

Inclined surface 351 has a curved cross section preferably comprising four curve segments, having radius of curvatures R3, R5, R6 and R7, respectively. First curve segment starts at point C and terminates at point E. A line M is drawn perpendicular to end surface 25a of valve plate and intersecting point C. The first curve segment crosses a line N, which drawn in parallel to line M, at point E. Second curve segment starts at point E and terminates at point F. The second curve segment crosses a line P, which is drawn in parallel to line M, at point F. Third curve segment starts at point F and terminates at point G. The third curve segment crosses a line Q, which is parallel to line M, at point G. Fourth curve segment starts at point G and terminates at point H. The fourth curve segment crosses a line S, which is parallel to line M, at point H. Lines N, P, Q divide the distance between line M and lines into quarters. Radius of curvature R3 approximates the natural vibration shape of discharge reed valve 81. The relationship of R3, R5, R6 and R7 are such that R7<R6<R5<R3.

A slight air gap is created between the curved cross section and the curve shaped reed valve 81 at its maximum amplitude when naturally vibrating with point C as the fulcrum as shown in phantom in FIG. 8. In such a structure, substantially the same advantages as those in the first preferred embodiment are realized. Moreover, the impact force with which discharge reed valve 81 impacts inclined surface 351 is smaller than that of FIG. 4. This is due to the fact that the inclined surface 351 of FIG. 8 comprises a curve having varying radii of curvature, which are smaller than the radius of curvature of inclined surface 251 of FIG. 4.

Figure 9:
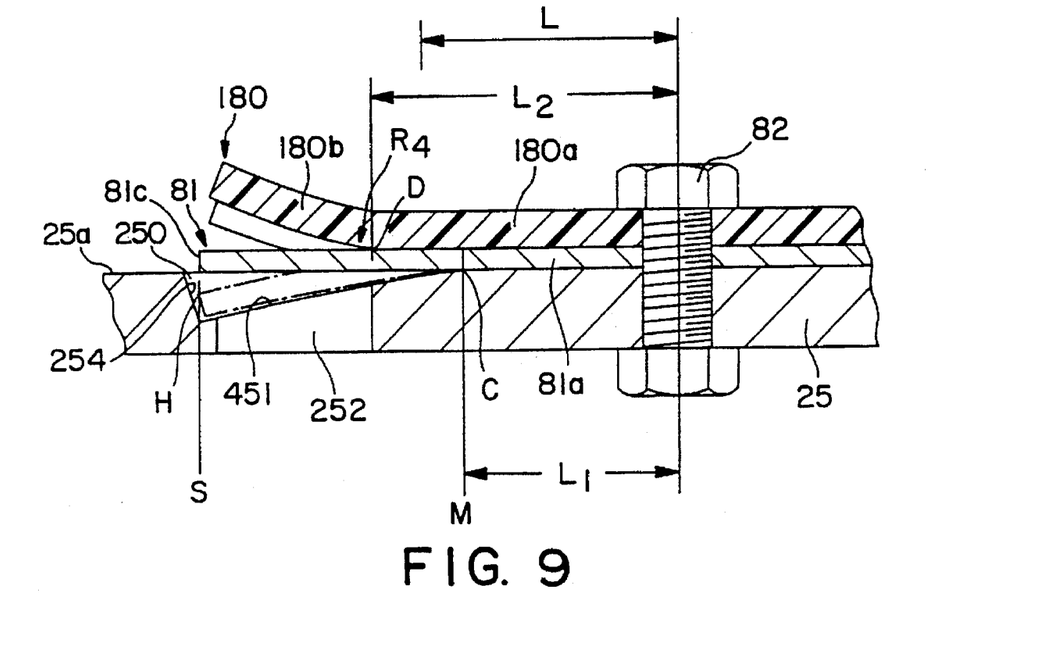
FIG. 9 is an enlarged partial sectional view of a discharge valve assembly in accordance with a third embodiment of the present invention.

FIG. 9 illustrates a third preferred embodiment of the present invention. Elements similar to those in the previous embodiments are represented by the same reference numerals. Instead of a curved cross section, flat surface 451 has a linear cross section starting at point C and terminating at point H. A slight air gap is created between the linear cross section and the curved shape assumed by reed valve 81 at its maximum amplitude, i.e., when vibrating in natural frequency with point C as the fulcrum as shown in phantom. Substantially the same advantages as those in the first preferred embodiment are realized.

Figure 10:
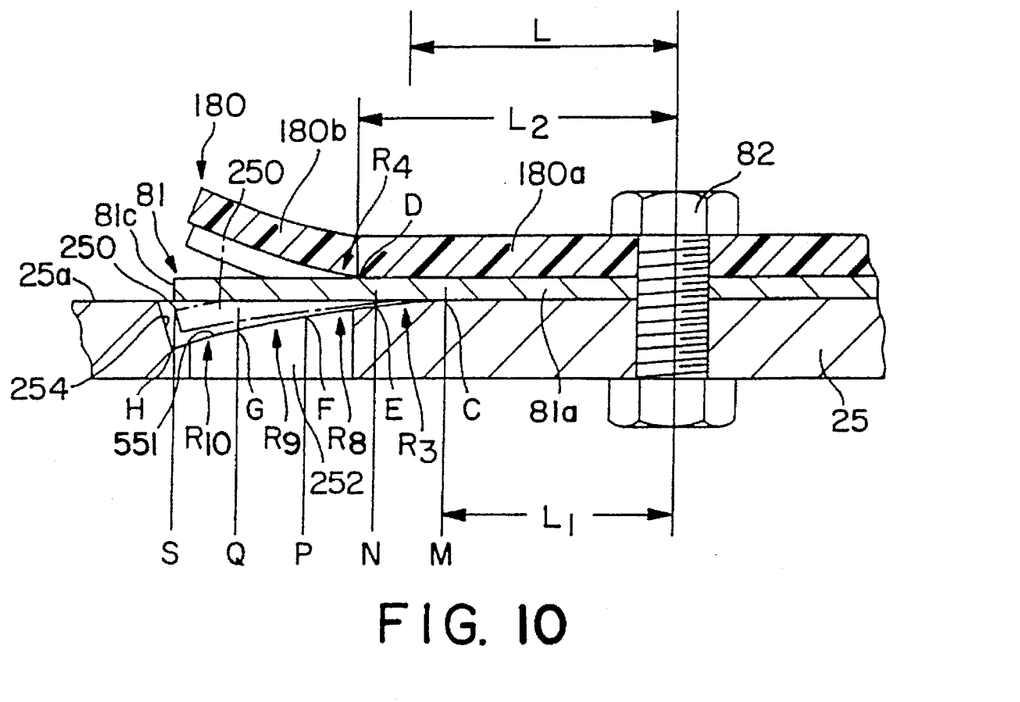
FIG. 10 is an enlarged partial sectional view of a discharge valve assembly in accordance with a fourth embodiment of the present invention.

FIG. 10 illustrates a fourth preferred embodiment of the present invention. Elements in FIG. 10 similar to those in FIGS. 8–9 are designated with the same reference numerals. Valve plate 25 includes recessed portion 250 whose depth increases with distance from point C, which is located on valve plate 25 and spaced a distance L1 from bolt 82. Recessed portion 250 includes curved or inclined surface 551 surrounding discharge hole 252. When discharge reed valve 81 is in its closed position, it sealingly contacts inclined curved surface 551.

Inclined curved surface 551 has a curved cross section preferably comprising four curve segments, having radius of curvatures R3, R8, R9 and R10, respectively. First curve segment, R3, starts at point C and terminates at point E. A line M is drawn perpendicular to end surface 25a of valve plate and intersecting point C. The first curve segment crosses a line N, which drawn in parallel to line M, at point E. Second curve segment, R8, starts at point E and terminates at point F. The second curve segment crosses a line P, which is drawn in parallel to line M, at point F. Third curve segment, R9, starts at point F and terminates at point G. The third curve segment crosses a line Q, which is parallel to line M, at point G. Fourth curve segment starts at point G and terminates at point H. The fourth curve segment, R10, crosses a line S, which is parallel to line M, at point H. Lines N, P, Q divide the distance between line M and lines into quarters. Radius of curvature R3 approximates the natural vibration shape of discharge reed valve 81. The relationship of R3, R8, R9, and R10 are such that R3<R8<R9<R10.

A slight air gap is created between the curved cross section and the curve shaped reed valve 81 at its maximum amplitude when naturally vibrating with point C as the fulcrum as shown in phantom in FIG. 10. In such a structure, substantially the same advantages as those in the third preferred embodiment are realized. Moreover, the impact force with which discharge reed valve 81 impacts inclined surface 551 is smaller than that of FIG. 4. This is due to the fact that the inclined surface 551 of FIG. 8 comprises a curve having varying radii of curvature, which are larger than the radius of curvature of inclined surface 251 of FIG. 4.

Figure 6:
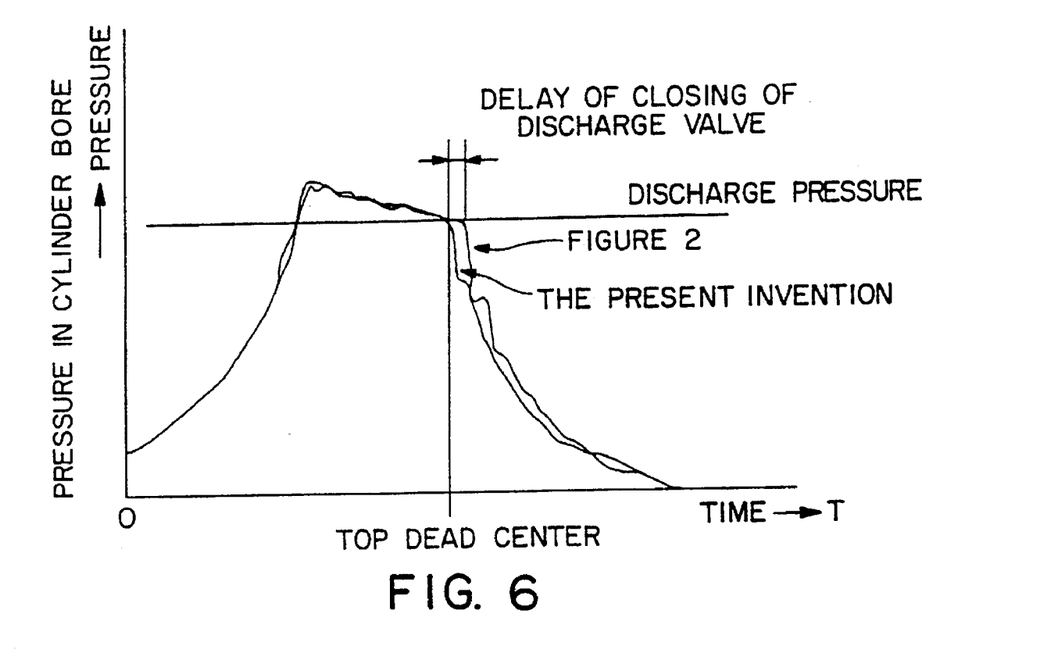
FIG. 6 is graphical illustration of the relationship between the pressure in the cylinder bore versus time T, in accordance with a first embodiment of the present invention.
Figure 7:
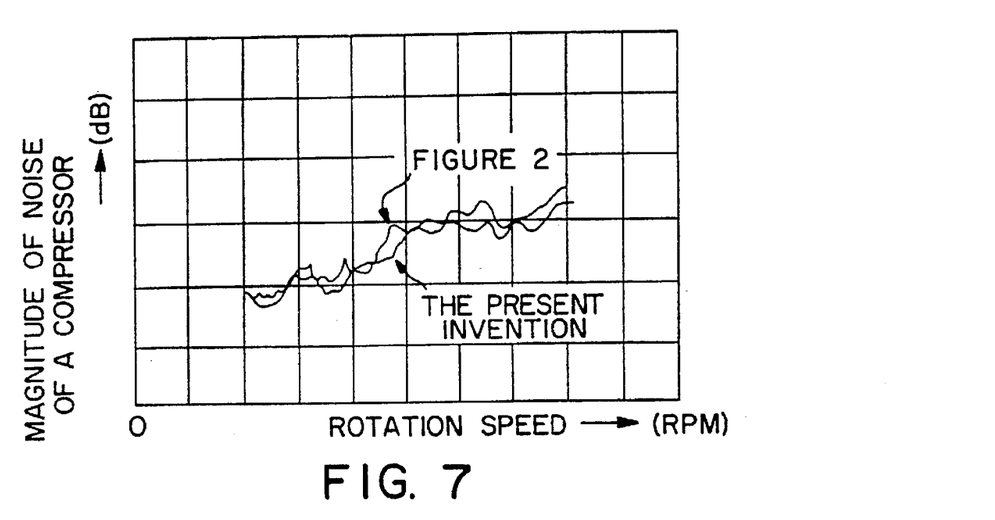
FIG. 7 is graphical illustration of the relationship between the magnitude of the noise of the compressor versus the rotation speed of the compressor, in accordance with a first embodiment of the present invention.

FIGS. 6 and 7 illustrate the relationship between the apparatus of preferred embodiments and that of FIG. 2. FIG. 6 depicts the pressure in cylinder bore versus time T. The preferred embodiments are shown to reduce the delay of closing discharge reed valve 81. Further, FIG. 7 shows the magnitude of noise caused by the compressor versus the rotational speed of the compressor. The preferred embodiments reduce the noise level of the compressor in comparison with the noise generated by the compressor of FIG. 2.

Although the present invention has been described in connection with the preferred embodiments, the invention is not limited thereto. It will be easily understood by those of ordinary skill in the art that variations and modifications can be easily made within the scope of this invention as defined by the appended claims. Thus, while the preferred embodiments illustrate the invention in a particular type of fluid displacement apparatus, i.e., a slant plate compressor, the invention can be used in any other type of fluid displacement apparatus, such as a scroll type fluid displacement apparatus.

We claim:

1. A fluid displacement apparatus comprising:

a housing including a front end plate and a rear end plate;

a valve plate member disposed in said housing and dividing said housing into a first chamber and a second chamber, said second chamber comprising a discharge chamber;

a passage formed in said valve plate member extending between said first chamber and said discharge chamber, said passage having an open end through which discharge fluid flows;

an elastic valve member disposed on said valve plate, said valve member having a spring constant allowing said passage to remain blocked until the pressure in said first chamber exceeds a predetermined value;

a valve retainer member secured by a securing member to said valve plate, said valve retainer member bent away from said valve plate member, said valve retainer member limiting bending movement of said valve member; and a valve seat formed on said valve plate around the open end of said passage, said valve seat comprising a recess formed in said valve plate, said recess including a surface inclined with increasing depth in the radial direction of said valve plate, said inclined surface beginning at a point radially outside a securing member, a point at which said valve retainer member is bent being radially outside said point where said inclined surface begins; wherein said inclined portion includes a curved cross section comprising a plurality of curves which have varying radii of curvature, said radii of curvature being, with increased radial distance from said securing means, successively greater than the adjacent preceding curve.

2. The fluid displacement apparatus of claim 1, wherein at least one of said radii of curvature of said curved cross sections approximates the maximum amplitude of natural vibration of said elastic valve member.

3. The fluid displacement apparatus of claim 2, wherein an air gap is created between said inclined portion and said elastic valve member when said elastic valve member reaches maximum amplitude in natural vibration.

4. The fluid displacement apparatus of claim 1, wherein said curved portion of said retainer member comprises a curved cross section having at least a first radius of curvature.

5. The fluid displacement apparatus of claim 1, wherein said retainer member comprises engineering plastic.

6. A fluid displacement apparatus comprising:

a housing including a front end plate and a rear end plate;

a valve plate member disposed in said housing and dividing said housing into a first chamber and a second chamber, said second chamber comprising a discharge chamber;

a passage formed in said valve plate member extending between said first chamber and said discharge chamber, said passage having an open end through which discharge fluid flows;

an elastic valve member disposed on said valve plate, said valve member having a spring constant allowing said passage to remain blocked until the pressure in said first chamber exceeds a predetermined value;

a valve retainer member secured by a securing member to said valve plate, said valve retainer member bent away from said valve plate member, said valve retainer member limiting bending movement of said valve member; and a valve seat formed on said valve plate around the open end of said passage, said valve seat comprising a recess formed in said valve plate, said recess including a surface inclined with increasing depth in the radial direction of said valve plate; wherein said inclined portion includes a curved cross section comprising a plurality of curves which have varying radii of curvature, said radii of curvature being, with increased radial distance from said securing means, successively greater than the adjacent preceding curve.

7. The fluid displacement apparatus of claim 6, said inclined surface beginning at a point radially outside a securing member, a point at which said valve retainer member is bent being radially outside said point where said inclined surface begins.

8. The fluid displacement apparatus of claim 6, wherein at least one of said radii of curvature of said curved cross sections approximates the maximum amplitude of natural vibration of said elastic valve member.

9. The fluid displacement apparatus of claim 8, wherein an air gap is created between said inclined portion and said elastic valve member when said elastic valve member reaches maximum amplitude in natural vibration.

10. The fluid displacement apparatus of claim 6, wherein said curved portion of said retainer member comprises a curved cross section having at least a first radius of curvature.

11. The fluid displacement apparatus of claim 6, wherein said retainer member comprises engineering plastic.

* * * * *